(12) United States Patent
Wahrenberg

(10) Patent No.: US 12,094,123 B2
(45) Date of Patent: Sep. 17, 2024

(54) IMAGE DATA PROCESSING APPARATUS AND METHOD

(71) Applicant: CANON MEDICAL SYSTEMS CORPORATION, Otawara (JP)

(72) Inventor: Magnus Fredrik Wahrenberg, Edinburgh (GB)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 358 days.

(21) Appl. No.: 17/658,455

(22) Filed: Apr. 8, 2022

(65) Prior Publication Data

US 2023/0326027 A1  Oct. 12, 2023

(51) Int. Cl.
*G06T 7/11* (2017.01)
*G06T 15/08* (2011.01)

(52) U.S. Cl.
CPC .......... *G06T 7/11* (2017.01); *G06T 15/08* (2013.01); *G06T 2207/10024* (2013.01); *G06T 2207/30004* (2013.01)

(58) Field of Classification Search
None
See application file for complete search history.

(56) References Cited

U.S. PATENT DOCUMENTS

| 2009/0103791 A1 | 4/2009 | Suri et al. | |
| 2010/0195934 A1 | 8/2010 | Toda | |
| 2014/0003701 A1* | 1/2014 | Masood | A61B 6/504 382/134 |
| 2018/0047176 A1* | 2/2018 | Toyoda | G06T 5/50 |
| 2018/0053334 A1 | 2/2018 | Schneider | |
| 2023/0233877 A1* | 7/2023 | Engel | A61N 5/103 702/189 |

FOREIGN PATENT DOCUMENTS

| CN | 101082983 A | 12/2007 |
| CN | 105528800 A | 4/2016 |
| CN | 106530386 A | 3/2017 |
| CN | 107330860 A | 11/2017 |
| CN | 108765277 A | 11/2018 |
| CN | 111476888 A | 7/2020 |
| CN | 112508790 A | 3/2021 |
| WO | WO 2015/115866 A1 | 8/2015 |

* cited by examiner

*Primary Examiner* — Tapas Mazumder
(74) *Attorney, Agent, or Firm* — Oblon, McClelland, Maier & Neustadt, L.L.P.

(57) ABSTRACT

A medical image processing apparatus comprises processing circuitry configured to: obtain medical image data comprising or representative of image data values and segmentation values for pixels or voxels of a volume; specify a sampling point within the volume; select a relevant pixel or voxel for the sampling point from a set of pixels or voxels neighboring the sampling point, wherein the selecting is based on a difference of an interpolated image data value at the sampling point and an image data value for each of the neighboring pixels or voxels and a distance between the sampling point and each of the neighboring pixels or voxels; and determine a segmentation value for the sampling point based on a segmentation value at a position of the selected relevant pixel or voxel.

20 Claims, 8 Drawing Sheets

IMAGE DATA PROCESSING APPARATUS AND METHOD

FIELD

Embodiments described herein relate generally to an apparatus and method for image data processing, for example a method for determining segmentation values for sampling points.

BACKGROUND

Volumetric medical imaging techniques that can produce three-dimensional medical image data using any of a variety of imaging modalities, for example CT, PET, MRI, ultrasound, and X-ray, are now widely used for imaging or diagnostic purposes.

Volumetric medical image data may comprise a three-dimensional array of voxels, each voxel representative of a particular position in three-dimensional space and each voxel having one or more data values. For example in the case of CT data, each voxel may have an associated intensity value that is representative of the attenuation of the applied X-ray radiation provided at the location represented by the voxel. The intensity value may be referred to as an image value, image data value, gray value, gray level, voxel value or CT value. The intensity value may be measured in Hounsfield units (HU).

A wide variety of rendering techniques are known that are used to process volumetric image data in order to display a desired representation of a patient or other subject. For example, the volumetric image data may be rendered to display a two-dimensional projection of the three dimensional volumetric data. The two-dimensional projection may include desired texture or shading effects, and may provide an impression of a surface in three dimensions to the viewer.

Commonly used volume rendering techniques use a transfer function to map each of a series of sampled voxel values to an opacity value and a color value (usually represented by a combination of red, green and blue color values). In ray casting and similar techniques, for each pixel in the 2D projection a virtual ray is cast from the perspective of the viewer through a corresponding point on a two-dimensional virtual image plane and through the volume represented by the volumetric image data. Color and opacity values are accumulated along the virtual ray to obtain a color for the pixel in the 2D projection.

At each of a plurality of sampling points along a ray, a data value for the sampling point may be obtained by interpolation of data values from a plurality of voxels near the sampling point, for example a set of 8 voxels that are nearest neighbors to the sampling point. Data values can be interpolated as a scalar field, for example by using trilinear interpolation of data values for nearest-neighbor voxels.

It is known to perform segmentation of imaging data, for example by assigning a respective classification label to each voxel in an imaging data set. Classification labels may typically be binary labels that are representative of whether a voxel is, or is not, part of a segmented object. A set of binary labels may be referred to as a mask.

The segmentation labels for the voxels in an imaging data set cannot be interpolated as a scalar field since the labels used cannot be mixed. In some embodiments, segmentation labels are converted to colors and the colors are interpolated. However, such methods may be resource-intensive.

Furthermore, segmentation data may typically be updated frequently. Segmentation data may often be contained in complex compressed data structures. For example, a hierarchy of blocks may be used as a segmentation data structure. Empty or full blocks may be summarized. The use of complex compressed data structures may make interpolation of segmentation values even more difficult. The use of multiple look-ups may be costly. In general, interpolation of segmentation is possible but may be very expensive.

In many current applications, no interpolation of segmentation values is performed. It has been found that a lack of interpolation for segmentation may have an impact on image quality.

FIG. 1 is a flow chart illustrating in overview a rendering method in which no interpolation of segmentation values is performed.

At stage 10, a set of source voxel data for a volume is obtained. The source voxel data comprises a respective image data value for each voxel in the volume, for example a respective grayscale value.

At stage 12, a sample position is obtained. The sample position is a sub-voxel position which lies between voxels for which voxel data values are known. The sample position may also be referred to as a sampling point.

At stage 14, a set of interpolation neighbors to the sample position is gathered. For example, the interpolation neighbors may be the 8 nearest voxels to the sample position. Each interpolation neighbor has an associated image data value which is retrieved from the source voxel data.

At stage 16, a set of weights is computed. For example, a respective weight may be computed for each interpolation neighbor, based on a distance from the interpolation neighbor to the sample position, such that closer interpolation neighbors have higher weights.

At stage 18, voxel data values for the interpolation neighbors are combined using the weights determined at stage 16. An image data value for the sample position is output.

At stage 20, a set of complex compressed segmentation data for the volume is obtained. The set of complex compressed segmentation data is representative of segmentation labels for each voxel in the volume, but the representation is a compressed representation, for example using a hierarchy of blocks.

At stage 22, a single segmentation value for the sample position is selected by finding the one of the voxels that is nearest in position to the sample position, and using the segmentation value for that voxel as the segmentation value for the sample position. No interpolation of segmentation values is performed. The simple selection of a single segmentation value for a sample position may in some cases result in aliasing. Boundaries in an image may appear jagged.

FIG. 3A shows an image that has been rendered without interpolation of segmentation. Sharp corners in the rendered image may give a visual impression of low quality or resolution. In the rendering of FIG. 3A, sharp corners of segmentation are the source of an issue, rather than a sharp boundary.

FIG. 3B shows a further image that has been rendered without interpolation of segmentation. Both FIG. 3A and FIG. 3B have a jagged appearance. The jagged appearance may lead to a lack of visual fidelity. The jagged appearance may result in a user lacking perception of the surface shape.

FIG. 2 is a flow chart illustrating in overview a rendering method in which a known, costly, method of interpolation of segmentation values is performed.

Stages 10 to 20 of FIG. 2 are the same as stages 10 to 20 of FIG. 1. In stages 10 to 18, image data values for nearest neighbor voxels are interpolated to provide a scalar image data value for the sample position. At stage 20, a set of complex compressed segmentation data for the volume is obtained.

At stage 24 of FIG. 2, a set of segmentation neighbors to the sample position is gathered. For example, the segmentation neighbors may be the 8 nearest voxels to the sample position. Each segmentation neighbor has an associated segmentation value which is retrieved from the complex compressed segmentation data. Segmentation values may be converted into colors. Retrieving the segmentation values for the segmentation neighbors may be computationally expensive.

At stage 26, a set of weights is computed. For example, a respective weight may be computed for each segmentation neighbor, based on a distance from the segmentation neighbor to the sample position, such that closer segmentation neighbors have higher weights.

At stage 28, 1 to 8 values or colors for the segmentation neighbors are combined using the weights determined at stage 26. Some voxels may have no mapped colors, so the number of values or colors to be combined for a given position may be between 1 and 8. A segmentation value for the sample position is output. The combining of values or colors may be computationally expensive.

FIG. 4 illustrates an image that has been rendered from the same imaging data as that from which FIG. 3A is rendered. FIG. 4 is rendered using interpolation of segmentation values, for example by converting the segmentation values to colors and interpolating the colors. FIG. 4 has better image quality than FIG. 3A. A stepping effect seen in FIG. 3A is not visible in FIG. 4. Interpolating segmentation values, for example as described in relation to FIG. 2, may produce better image quality than omitting interpolation of segmentation values but may be very costly.

SUMMARY

In a first aspect, there is provided a medical image processing apparatus comprising processing circuitry configured to: obtain medical image data comprising or representative of image data values and segmentation values for pixels or voxels of a volume; specify a sampling point within the volume; select a relevant pixel or voxel for the sampling point from a set of pixels or voxels neighboring the sampling point, wherein the selecting is based on a difference of an interpolated image data value at the sampling point and an image data value for each of the neighboring pixels or voxels and a distance between the sampling point and each of the neighboring pixels or voxels; and determine a segmentation value for the sampling point based on a segmentation value at a position of the selected relevant pixel or voxel.

The determined segmentation value for the sampling point may be the same as the segmentation value for the selected relevant pixel or voxel.

Each segmentation value may comprise a mask value or a label. The segmentation values may be representative of one or more anatomical structures.

The processing circuitry may be further configured to perform an interpolation of image data values for neighboring pixels and voxels to obtain the interpolated image data value at the sampling point. The interpolation may comprise trilinear interpolation.

The selecting may comprise determining a respective score for each of the neighboring pixels or voxels.

The relevant pixel or voxel may be the neighboring pixel or voxel of the set of neighboring pixels or voxels that has the lowest determined score.

For each neighboring pixel or voxel, the score may comprise a sum of a similarity term comprising the difference of the interpolated image data value at the sampling point and the image data value for the neighboring pixel or voxel, and a distance term comprising the distance between the sampling point and the neighboring pixel or voxel. The sum may be a weighted sum comprising relative weightings for the similarity term and the distance term.

The processing circuitry may be further configured to calculate a gradient based on the score for use in rendering at least one image from the medical image data. The processing circuitry may be configured to create a continuous field by multiplying values for the score with image data values. The gradient may be a gradient of the continuous field.

The processing circuitry may be further configured to determine the distance between the sampling point and each of the neighboring pixels or voxels using at least one of: interpolation weights, Euclidean distance, vector L1 norm, vector L2 norm, vector max norm.

The image data values may be grayscale values.

The image data values may be color values. The difference may be a difference between color values. The difference between image data values may comprise at least one of a color channel vector L1 norm; a color channel vector L2 norm; a color channel vector max norm; a distance in LAB color space; a measure of at least one of brightness, lightness and value.

The processing circuitry may be further configured to render at least one image from the medical image data using the determined segmentation value.

The rendering of the at least one image may comprises at least one of: shaded direct volume rendering; global illuminated direct volume rendering; intensity projection; MPR (multiplanar reformation); MPR slab; full volume maximum intensity projection; full volume minimum intensity projection; full volume average intensity projection.

The rendering of the at least one image may comprise rendering a segmentation overlay image.

In a further aspect, which may be provided independently, there is provided a method comprising: obtaining medical image data comprising or representative of image data values and segmentation values for pixels or voxels of a volume; specifying a sampling point within the volume; selecting a relevant pixel or voxel for the sampling point from a set of pixels or voxels neighboring the sampling point, wherein the selecting is based on a difference of an interpolated image data value at the sampling point and an image data value for each of the neighboring pixels or voxels and a distance between the sampling point and each of the neighboring pixels or voxels; and determining a segmentation value for the sampling point based on a segmentation value at a position of the selected relevant pixel or voxel.

In a further aspect, which may be provided independently, there is provided a medical image processing apparatus comprising processing circuitry configured to: receive medical image data including segmentation target, determine a scalar field based on data values included in the medical image data, specify a sampling point included in a boundary of the segmentation targets within the determined scalar field, specify relevant pixel or voxel of the sampling point from neighbor pixels or voxels of the sampling point, based on difference of interpolated data value of the sampling point and data value of each neighbor pixels or voxels and a physical distance between the sampling point and the each neighbor pixels or voxels, perform a segmentation based on the specified relevant pixel or voxel.

In a further aspect, which may be provided independently, there is provided a medical imaging method comprising:

A scalar volume;

A separate segmentation structure containing mask data or labels;

In which:

The segmentation voxel used is picked by evaluating which neighbor voxel from the scalar volume interpolation is most similar to the interpolated value;

The similarity is combined with a neighbor distance metrics to form a suitability score for each neighbor voxel;

The voxels achieving the lowest score is picked as the segmentation voxel to use.

The distance metrics may be based on:

Interpolation weights;

Euclidean distances;

Vector L1, L2, Max Norm.

The gradient (normal) may be calculated based on the central difference of the score similarity score.

The similarity may be based on a color volume with color similarity expressed through Color channel L1,L2,Max vector norm;

Brightness (Luma), Lightness, Value only;

Distance in LAB color space.

In a further aspect, which may be provided independently, there is provided a medical image processing apparatus comprising processing circuitry configured to: perform an interpolation process to interpolate a set of segmentation data representative of at least one structure present in a volume thereby to obtain interpolated segmentation data for a selected position, wherein the segmentation data is obtained from or associated with medical image data, optionally scalar volume data, comprising a set of voxels that represents the volume, and wherein the interpolation comprises: performing an interpolation of the medical image data to determine an interpolated value for the selected position; determining similarity values between for voxels of the medical image data neighboring the selected position based on similarity between values for the voxels and the determined interpolated value; selecting a data point from the set of segmentation data based at least in part on the determined similarity values for the voxels of the medical image data set, and using the selected data point as, or in order to obtain, the interpolated segmentation data for the selected position.

The selecting of the data point from the set of segmentation data may be based on both the determined similarity values and a distance metric.

The distance metric may be based on at least one of: interpolation weights; and/or Euclidean distance; and/or Vector L1, L2, Max Norm.

The segmentation data may comprise a set of segmentation voxels and the selecting of a data point from the set of segmentation data may comprise selecting one of the segmentation voxels.

The medical image data set may represent a color volume and the similarity values may be determined at least in part based on similarity of color.

The similarity of color may be determined based at least in part on: color channel L1, L2 Max vector norm; and/or brightness; and/or distance in color space, for example LAB color space.

The interpolated segmentation data may be used in at least one of shaded direct volume rendering, global illumination direct volume rendering, segmentation overlay or color selection as part of full volume MIP/MINIP/AVIP rendering or MPR/MPR Slab or other intensity projection modes.

The at least one structure may comprise at least one anatomical structure, and/or the segmentation data may comprise mask data and/or labels.

Features in one aspect may be provided as features in any other aspect as appropriate. For example, features of a method may be provided as features of an apparatus and vice versa. Any feature or features in one aspect may be provided in combination with any suitable feature or features in any other aspect.

BRIEF DESCRIPTION OF THE DRAWINGS

Embodiments are now described, by way of non-limiting example, and are illustrated in the following figures, in which.

DETAILED DESCRIPTION

Figure 5:
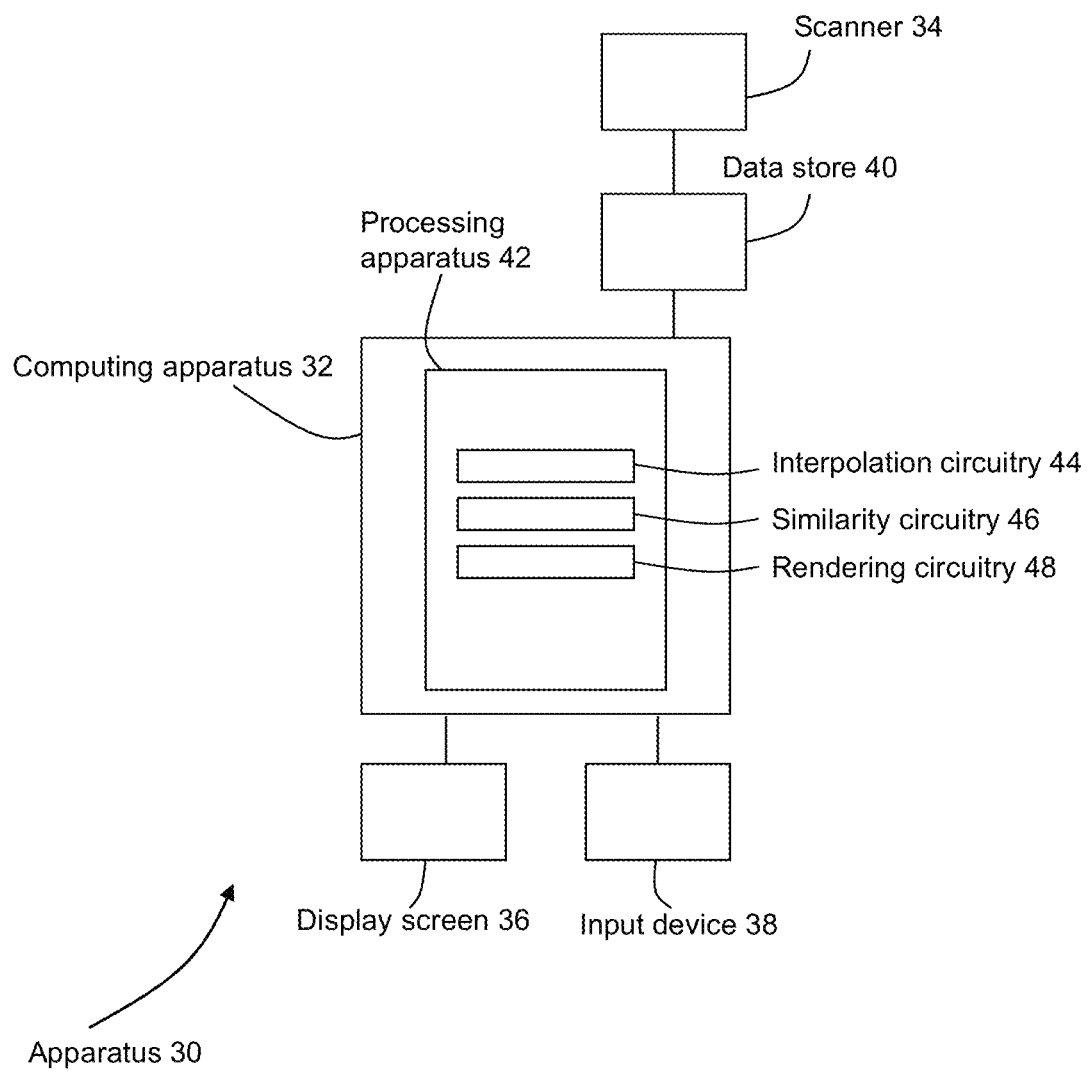
FIG. 5 is a schematic diagram of an apparatus according to an embodiment.

A medical image processing apparatus 30 according to an embodiment is illustrated schematically in FIG. 5. The medical image processing apparatus 30 comprises a computing apparatus 32, in this case a personal computer (PC) or workstation, which is connected to a scanner 34 via a data store 40.

The medical image processing apparatus 30 further comprises one or more display screens 36 and an input device or devices 38, such as a computer keyboard, mouse or trackball.

In the present embodiment, the scanner 34 is a CT (computed tomography) scanner which is configured to obtain volumetric CT scans. The scanner 34 is configured to generate image data that is representative of volume comprising at least one anatomical region of a patient or other subject. The image data represents a plurality of voxels each having a corresponding image data value, which in the case of CT scanning is an intensity value, for example a value in Hounsfield units. In other embodiments the image data represents a plurality of pixels instead of a plurality of voxels.

In further embodiments, the scanner 34 may be configured to obtain two-, three- or four-dimensional image data in any imaging modality. For example, the scanner 34 may comprise a magnetic resonance (MR) scanner, computed tomography (CT) scanner, cone-beam CT scanner, positron emission tomography (PET) scanner, X-ray scanner, or ultrasound scanner.

In the present embodiment, image data sets obtained by the scanner 34 are stored in data store 40 and subsequently provided to computing apparatus 32. In an alternative embodiment, image data sets are supplied from a remote data store (not shown). The data store 40 or remote data store may comprise any suitable form of memory storage. In some embodiments, the medical image processing apparatus 30 is not coupled to any scanner.

Computing apparatus 32 comprises a processing apparatus 42 for processing of data. The processing apparatus comprises a central processing unit (CPU) and Graphical Processing Unit (GPU). The processing apparatus 42 provides a processing resource for automatically or semi-automatically processing medical image data sets. In other embodiments, the data to be processed may comprise any image data, which may not be medical image data.

The processing apparatus 42 includes interpolation circuitry 44 configured to perform interpolation of data values, similarity circuitry 46 configured to determine values for a similarity score, and rendering circuitry 48 configured to render images.

In the present embodiment, the circuitries 44, 46, 48 are each implemented in the CPU and/or GPU by means of a computer program having computer-readable instructions that are executable to perform the method of the embodiment. In other embodiments, the various circuitries may be implemented as one or more ASICs (application specific integrated circuits) or FPGAs (field programmable gate arrays).

The computing apparatus 32 also includes a hard drive and other components of a PC including RAM, ROM, a data bus, an operating system including various device drivers, and hardware devices including a graphics card. Such components are not shown in FIG. 5 for clarity.

Figure 6:
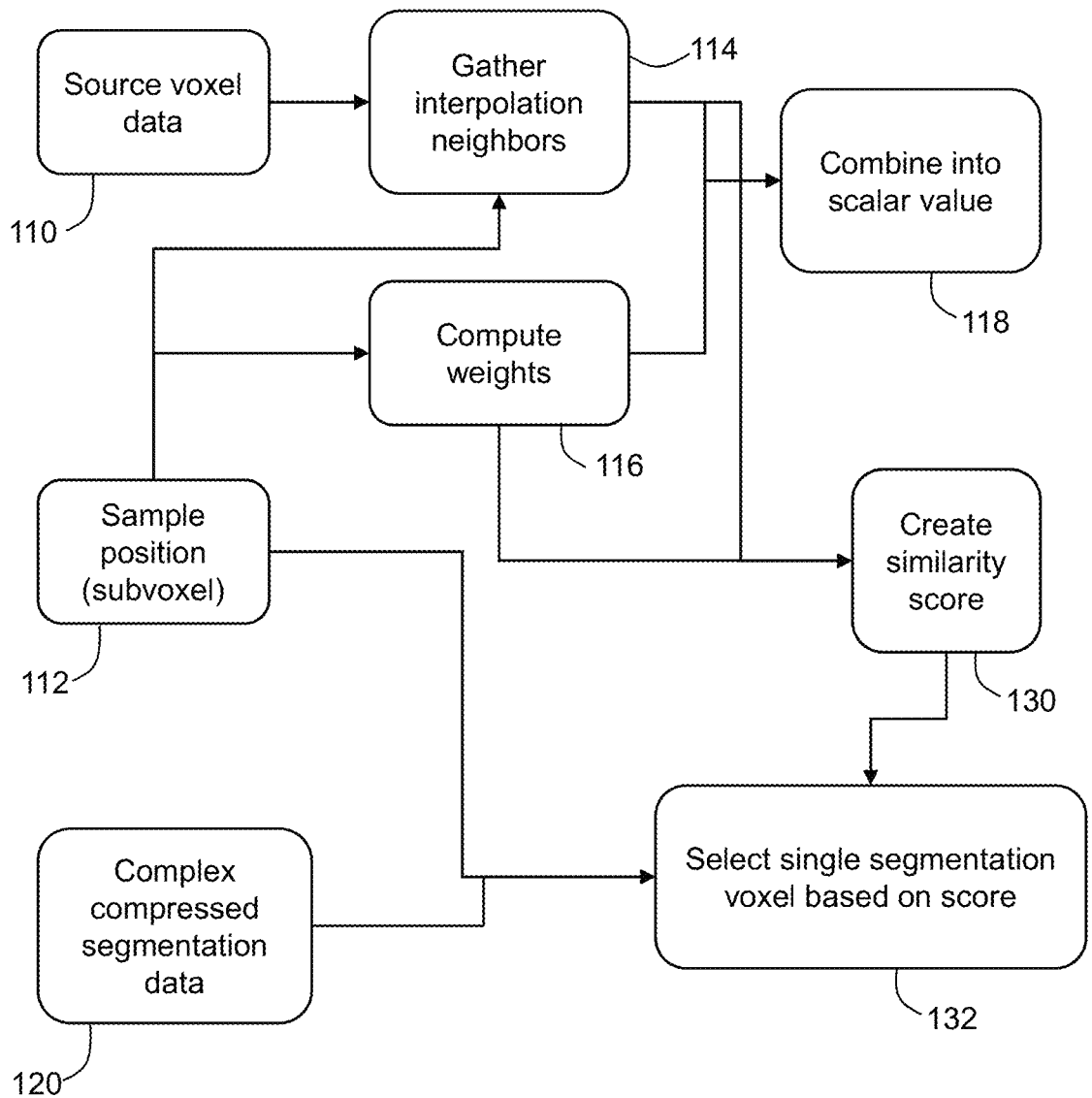
FIG. 6 is a flow chart illustrating in overview a method in accordance with an embodiment.
Figure 7:
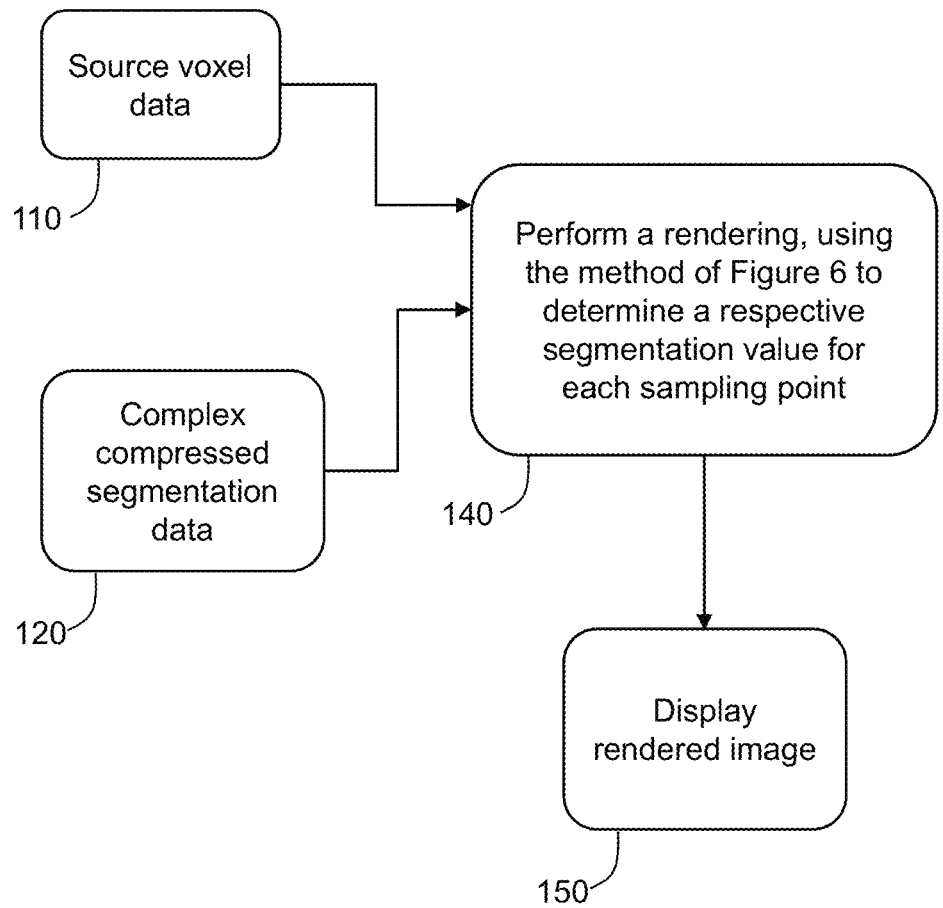
FIG. 7 is a flow chart illustrating in overview a method in accordance with an embodiment.

The apparatus of FIG. 5 is configured to perform a method of processing medical image data as illustrated in FIG. 6, and a rendering method as illustrated in FIG. 7.

At stage 110 of FIG. 5, the interpolation circuitry 44 receives a volumetric image data set obtained from a CT scan performed by scanner 34. The volumetric image data set may also be referred to as a set of source voxel data or a scalar volume. The volumetric image data set comprises respective intensity values for a plurality of voxels of the volumetric image data set. The intensity values may also be referred to as image data values. In other embodiments, the volumetric image data set may be obtained from any suitable scanner or scanners. In some embodiments, the interpolation circuitry 44 receives first volumetric image data having a first, lower resolution and performs an initial interpolation of the first volumetric image data to obtain the volumetric image data set of stage 110, where the volumetric image data set has a second, higher resolution.

In further embodiments, the volumetric image data set may comprise any appropriate image data, which may not be medical. In other embodiments, the interpolation circuitry 44 may receive any suitable image data set which may comprise voxels or pixels and associated image data values for the voxels or pixels.

At stage 112, the interpolation circuitry 44 receives a sample position, which may also be referred to as a sampling point. For example, the sample position may be position that has been determined by the rendering circuitry 48 as part of a rendering process, for example a ray-tracing process. The sample position is a sub-voxel position, which does not coincide with any voxel position of the volumetric image data set.

At stage 114, the interpolation circuitry 44 gathers a set of interpolation neighbors for the sample position. In the embodiment of FIG. 6, the interpolation neighbors are the 8 nearest neighbor voxels to the sample position. In other embodiments, any suitable set of interpolation neighbors may be used. For example, both nearest-neighbor and next-to-nearest-neighbor voxels may be used. The interpolation circuitry 44 obtains a respective image data value for each of the interpolation neighbors. The data value is a scalar field value. In the present embodiment, the image data value is a grayscale value obtained from the volumetric imaging data set that was received at stage 110. In other embodiments, any suitable scalar field value may be used. In further embodiments as further described below, the image data value may be any suitable data value. For example, the image data value may comprise multi-dimensional data such as color values.

At stage 116, the interpolation circuitry 44 computes a set of weights. The set of weights comprises a respective interpolation weight for each interpolation neighbor. In the embodiment of FIG. 6, each interpolation weight is based on a distance from the interpolation neighbor to the sample position, such that closer interpolation neighbors have higher weights. For example, the interpolation weights may be obtained using a standard trilinear interpolation method.

At stage 118, the interpolation circuitry 44 combines the image data values and interpolation weights for the interpolation neighbors to obtain an image data value for the sample position. The image data value is a scalar field value, which in the embodiment of FIG. 6 is a grayscale value.

At stage 120, the similarity circuitry 46 receives a set of segmentation data that is representative of a respective segmentation label for each voxel in a segmentation data volume. The set of segmentation data may also be referred to as a segmentation structure. The set of segmentation data may comprise one or more masks. The segmentation labels may also be described as mask values. The set of segmentation data may be provided separately from the volumetric image data set. The set of segmentation data may have been obtained from the volumetric image data set using any suitable segmentation method. In some embodiments, the segmentation is supplied and/or edited by a user. In some embodiments, anatomy and/or pathology is automatically labelled. In some embodiments, simple algorithms such as thresholding may be used.

The segmentation labels may be indicative of whether or not a given voxel falls within a boundary of an anatomical structure, for example an organ, that has been segmented. The anatomical structure may also be referred to as a segmentation target. The segmentation labels may be representative of any suitable anatomical structure or structures.

In the embodiment of FIG. 6, voxels of the segmentation volume have corresponding positions to voxels of volumetric image data set received at stage 110. Each voxel in the segmentation volume may be referred to as a segmentation voxel. In other embodiments, the segmentation volume may cover only part of the volume of the volumetric image data set. In further embodiments, the segmentation volume may have a different resolution from the volume of the volumetric image data set.

In the embodiment of FIG. 6, the segmentation data is compressed using a hierarchy of blocks and may be described as complex compressed segmentation data. In other embodiments, the segmentation data may be compressed in any suitable manner, or the segmentation data may not be compressed.

At stage 130, the similarity circuitry 46 determines values for a similarity score for each of the interpolation neighbors. The similarity score may also be referred to as a suitability score. The similarity score includes a similarity term that represents a similarity between the grayscale value of the interpolation neighbor and the interpolated grayscale value that was determined for the sample position at stage 118. In the embodiment of FIG. 6, the similarity term is an absolute difference between the grayscale value of the interpolation neighbor and the grayscale value that was determined for the sample position at stage 118. In other embodiments, any measure of similarity in value between image data values may be used.

The similarity score further includes a distance term that is representative of a distance between the interpolation neighbor and the sample position in a coordinate space of the volumetric image data set. The distance may be a real or Euclidean distance. The distance may be described as a physical distance, because it is representative of a distance in a real-life coordinate space that is scanned by the scanner. The distance term may be based on the interpolation weights that were computed at stage 116. In further embodiments, any suitable distance may be used. The distance may be a vector norm, for example an L1 norm, L2 norm or maximum norm (max norm). The use of a distance term may give spatial consistency to the similarity score.

In the embodiment of FIG. 6, each of the similarity term and the distance term is weighted to balance a contribution of the similarity term and a contribution of the distance term.

For example, in pseudocode:
Sample value=trilinear_interpolation (current voxel position)
Neighborhood values [8]={n0 . . . n8}
Corresponding position [8]={[0,0,0],[1,0,0] . . . [1,1,1]

In this example, the neighborhood values are the image data values, for example grayscale values, for the interpolation neighbors which are the 8 nearest-neighbor voxels. The positions for the interpolation neighbors are the corresponding positions. The current voxel position is the sample position, and the sample value is the data value, for example grayscale value, at the sample position.

A similarity score is determined for each of the 8 nearest-neighbor voxels. The similarity score is written as:

Score=abs(Sample value−Neighborhood value)*k+ distance(current voxel position)*m In the above similarity score, the similarity term is abs (Sample value−Neighborhood value), which the absolute difference between the image data value at the sample position and the image data value at the nearest-neighbor voxel. The similarity term is multiplied by a weighting k. The weighting k may be pre-programmed or may be selected by a user.

The distance term is distance (current voxel position), which is a distance between the sample position and the position of the nearest-neighbor voxel. Any suitable distance may be used as described above. The distance term is multiplied by a weighting m. The weighting m may be pre-programmed or may be selected by a user.

At stage 132, the similarity circuitry 46 selects a single one of the interpolation neighbors based on the similarity scores for the interpolation neighbors. In the embodiment of FIG. 6, the similarity circuitry 46 selects the one of the interpolation neighbors that has the lowest similarity score. In embodiments in which a different similarity score is used, the similarity circuitry 46 may select the one of the interpolation neighbors that has the highest similarity score. The selected one of the interpolation values may be referred to as a selected voxel or as a relevant voxel.

The interpolation circuitry 44 accesses the segmentation data to determine the segmentation value for a selected segmentation voxel that corresponds to the relevant voxel. The interpolation circuitry 44 assigns a segmentation value to the sample position that is the same as the segmentation value for the selected segmentation voxel.

In the pseudocode example:
Index=minimum (Score)
Segmentation neighbor used=Corresponding position [index]

The similarity scores of the interpolation neighbors are compared and a minimum is found, which is designated as index in the pseudocode. A segmentation voxel is identified that has a position corresponding to the position of the interpolation neighbor that has the lowest score. The segmentation value for the identified segmentation value is used as the segmentation value for the sample position.

In the method of FIG. 6, a segmentation obtained at stage 120 is paired with the grayscale scalar field obtained at stage 110. Aspects of the grayscale interpolation that was performed at stages 112 to 118 are used to create a better segmentation outline.

FIG. 7 is a flow chart illustrating in overview a rendering method in accordance with an embodiment. At stage 110, a volumetric image data set is obtained by the interpolation circuitry 44. At stage 120, a set of segmentation data is received by the similarity circuitry 46. At stage 140, the rendering circuitry performs a rendering process in which a method as described above with reference to FIG. 6 is used to obtain a respective segmentation values for each of a plurality of sample positions used in the rendering. For example, in the case of a ray-tracing process, the method of FIG. 6 may be used to obtain segmentation values for all sampling points in a ray and for all rays used to create a rendered image.

Any suitable rendering method may be used at stage 140. For example, the rendering method may comprise direct volume rendering of global illuminated direct volume rendering. The rendering method may comprise an intensity projection method. The rendering method may comprise MPR (multiplanar reformation) or MPR slab. The rendering method may comprise full volume maximum intensity projection, full volume minimum intensity projection or full volume average intensity projection.

At stage 150, the rendering circuitry 48 outputs at least one rendered image, for example by displaying the at least one rendered image on the display screen 36. In some embodiments a single image is rendered. In other embodiments, multiple images may be rendered.

In some embodiments, a first image is rendered that is representative of the image data and a second image is rendered that is representative of segmentation data. The second image may be overlaid on the first image to create a segmentation overlay image. The use of separate images may provide more efficient post-processing.

In further embodiments, two or more images are rendered, in which each image is representative of a respective color.

In some embodiments, color selection is performed, in which an intensity image is tinted with a color based on the segmentation label instead of segmentation being presented as an overlay.

Figure 8:
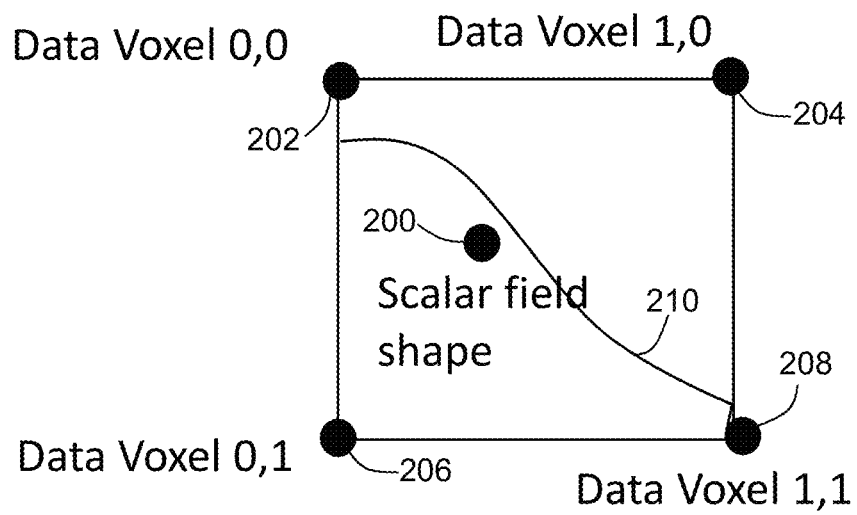
FIG. 8 is a schematic diagram showing a sampling point and a set of neighboring voxels.

FIG. 8 shows a simplified visual representation of a sampling point 200 and a set of neighboring voxels 202, 204, 206, 208. FIG. 8 shows a 2-dimensional example for simplicity. The neighboring voxels 202, 204, 206, 208 have coordinates (0,0), (1,0), (0,1), (1,1). Each neighboring voxel has an associated image data value.

A boundary 210 between materials passes through the region shown in FIG. 8. The boundary 210 results in a scalar field shape as illustrated in FIG. 8. The scalar field shape influences which segmentation voxel the rendering should snap to. The choice of segmentation voxel is not only based on the location of the sampling point, but is also based on the scalar field.

Figure 9:
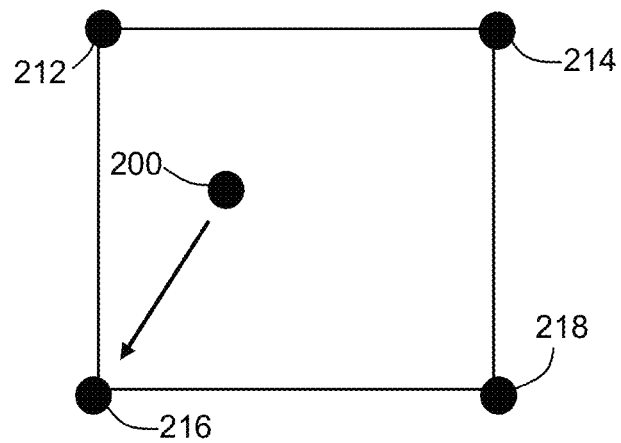
FIG. 9 is a schematic diagram showing a sampling point and a set of neighboring segmentation voxels.

FIG. 9 shows the sampling point 200 with a set of corresponding segmentation voxels 212, 214, 216, 218 having the same coordinate positions as the neighboring voxels 202, 204, 206, 208. Each segmentation voxel has an associated segmentation value. In the example of FIG. 8 and FIG. 9, the scalar field of FIG. 8 is used to influence the choice of segmentation voxel in FIG. 9. The sampling point uses the segmentation voxel 216 at (0,1).

When interpolating the scan volume, at the point of interpolation, the similarity circuitry 46 considers which neighbor has the most similar intensity to the interpolated value. In the embodiment of FIG. 6, the 8 nearest-neighbors are used for linear interpolation. In other embodiments, more neighbors may be used.

The similarity in intensity is combined with a distance metric to make sure that ordering is maintained. For example, in the case in which segmentation values are obtained for multiple sample positions along a ray, the use of a distance metric may ensure that the segmentation values selected do not change an order of accumulation. The use of a distance term makes the algorithm more likely to snap to a nearest corner. This may avoid a scenario in which undesirable shapes appear due to minor differences in intensity resulting in an inconsistent or unexpected choice of nearest-neighbour voxel. The function may behave more consistently when a distance term is included.

The distance metric includes a distance from the sample position to the neighbor voxel. The distance may be Euclidean distance or may be based on the interpolation weight. In some embodiments, use of the interpolation weight may be more efficient since the interpolation weight already needs to be calculated to perform an interpolation of intensity.

A choice of segmentation voxel, and therefore a segmentation value, is obtained by interpolating the volumetric image data set. Since interpolating of the volumetric image data set is already performed to determine an interpolated data value for the sampling point, almost no additional work may be required to obtain the segmentation voxel and segmentation value. There may be very little change in performance when compared with a method in which no interpolation of segmentation values is performed. There may be very little change in memory usage when compared with a method in which no interpolation of segmentation values is performed. Aliasing may be reduced without adding significant complexity to the calculations performed.

Figure 2:
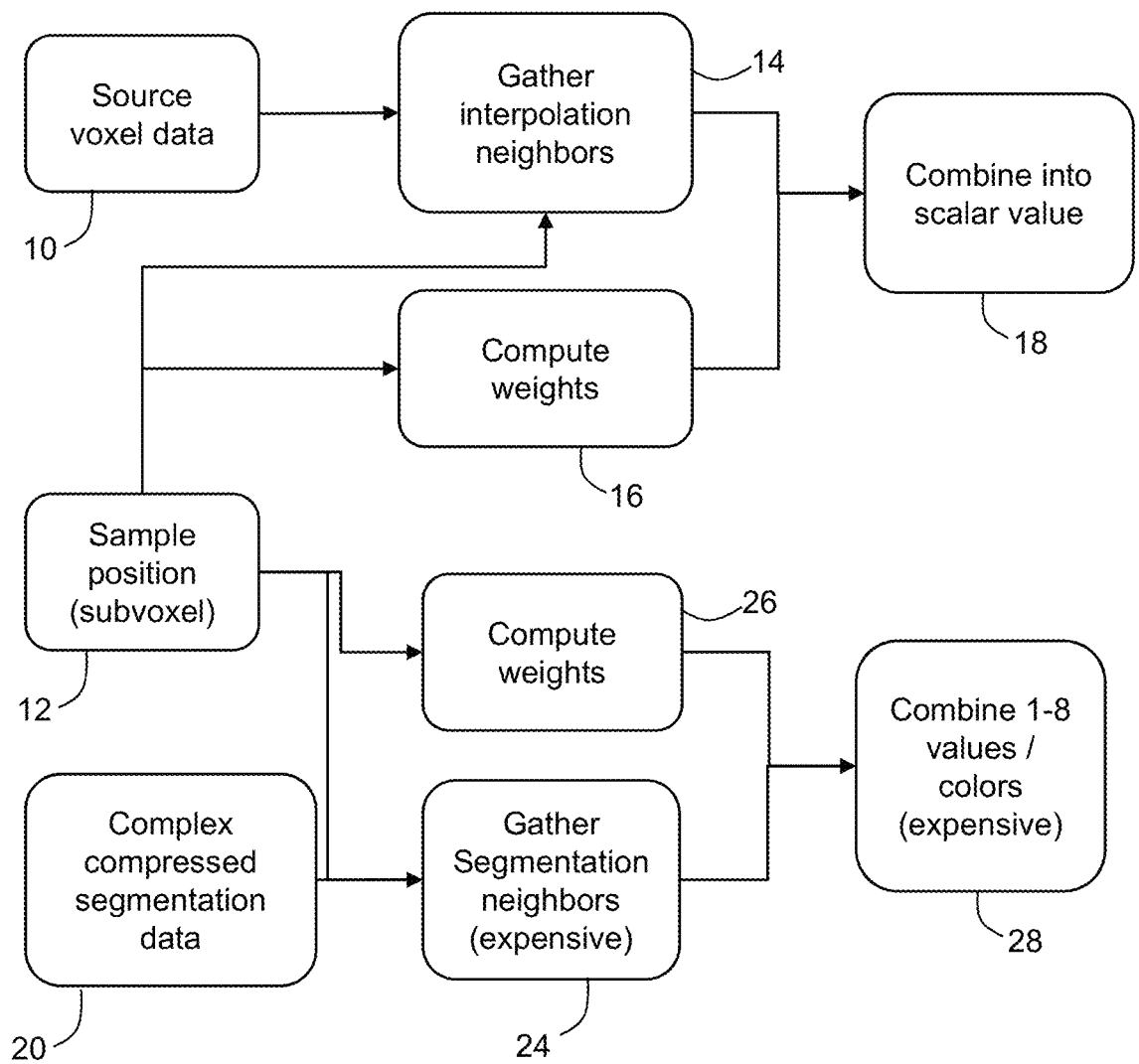
FIG. 2 is a flow chart illustrating in overview a rendering method in which segmentation values are interpolated.
Figure 3A:
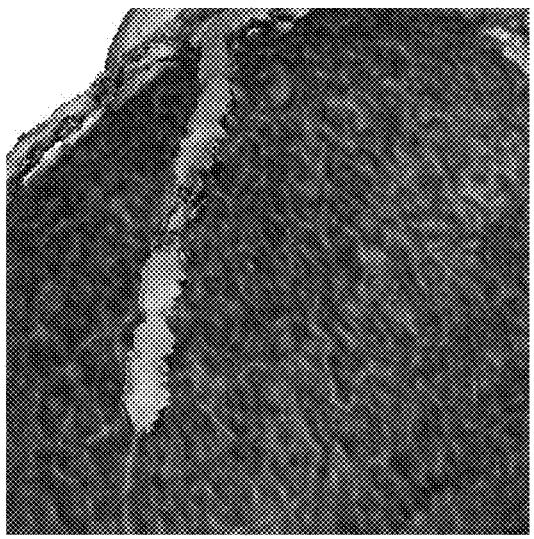
FIG. 3A is an image rendered without interpolation of segmentation values.
Figure 3B:
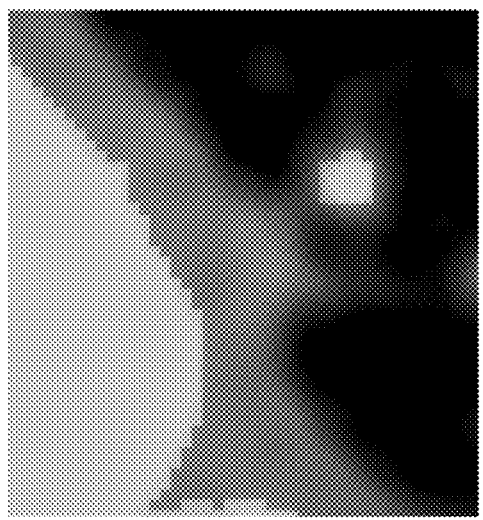
FIG. 3B is an image rendered without interpolation of segmentation values.
Figure 4:
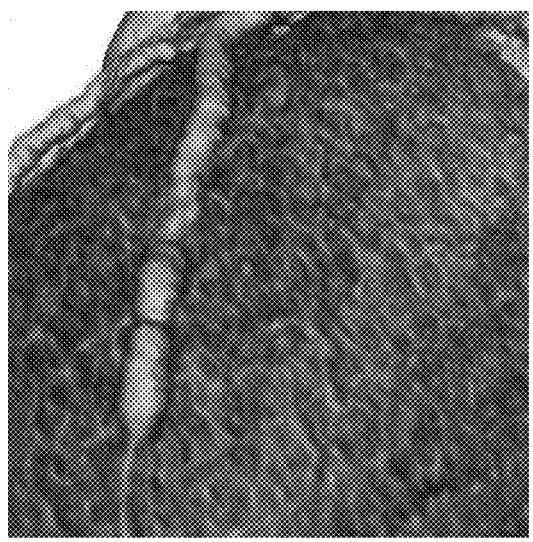
FIG. 4 is an image rendered with interpolation of segmentation values.

Improved segmentation may be obtained without having to perform a full interpolation of segmentation values, for example an interpolation as described above with reference to FIG. 2.

Embodiments may provide an extremely efficient method to avoid aliased segmentation by having the volume data interpolation inform the segmentation interpolation by determining which segmentation voxel best represents the sample position. A segmentation voxel is picked by evaluating which neighbor voxel from a scalar volume interpolation is most similar to the interpolated data value from the scalar volume interpolation. The similarity is combined with a neighbor distance metric to form a suitability score for each neighbor voxel. The voxel achieving the lowest score is picked as the segmentation voxel to use.

Figure 1:
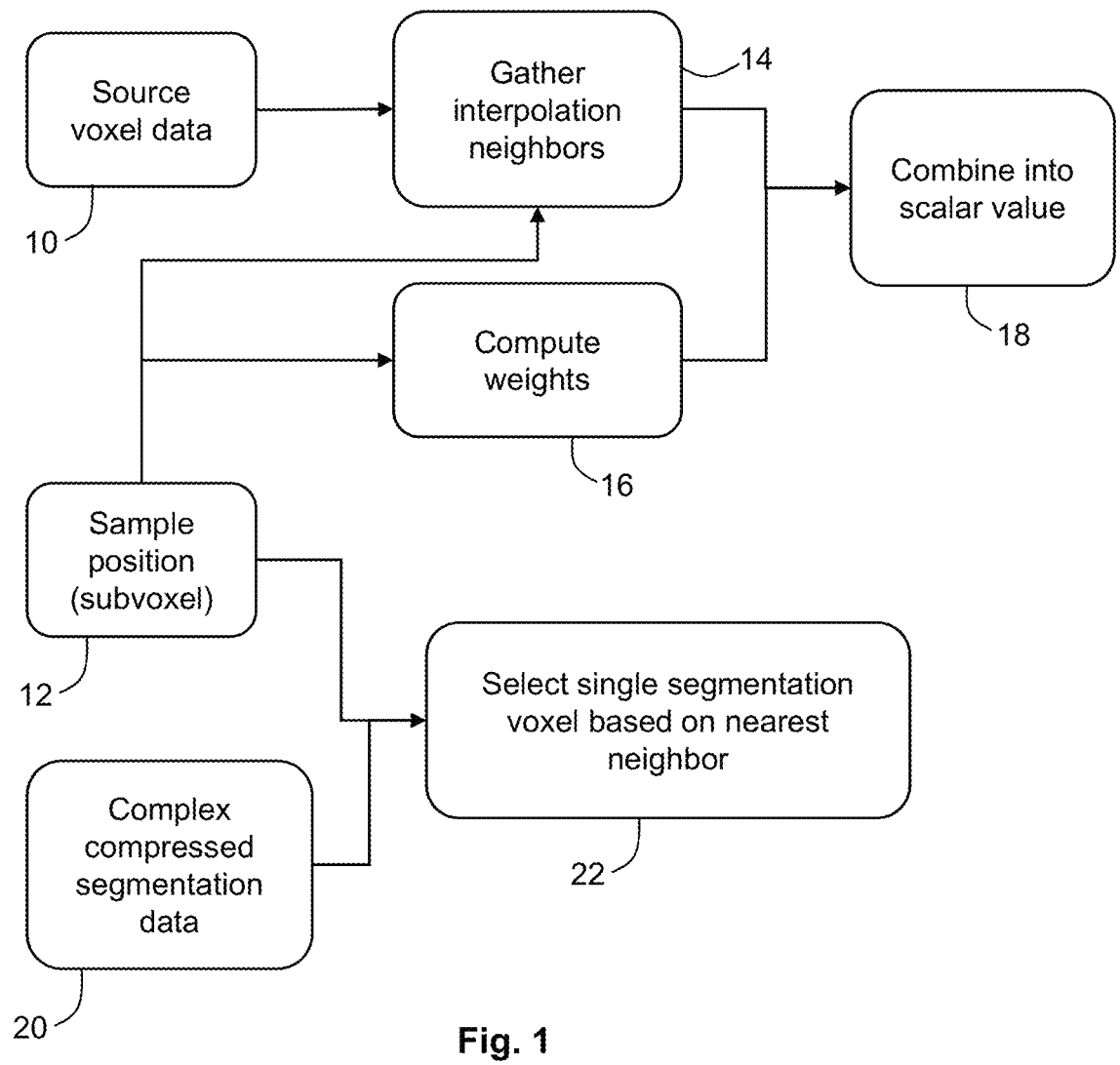
FIG. 1 is a flow chart illustrating in overview a rendering method in which no interpolation of segmentation values is performed.
Figure 10:
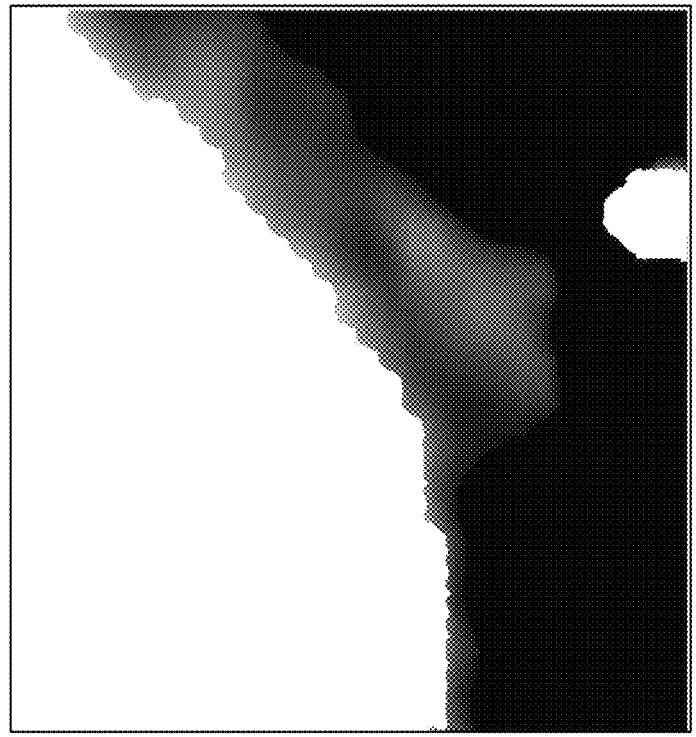
FIG. 10 is an image rendered using a rendering method in accordance with an embodiment.
Figure 11:
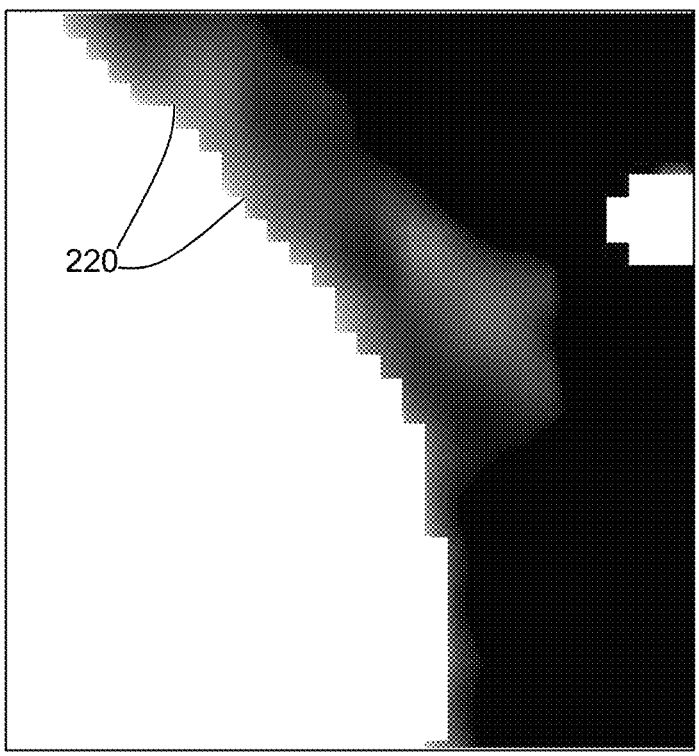
FIG. 11 is an image rendered using a rendering method in which no interpolation of segmentation values is performed.

FIG. 10 shows a multiplanar reconstruction (MPR) image rendered using segmentation values obtained using the method of FIG. 7. FIG. 11 show an MPR image rendered using segmentation values obtained using a nearest-neighbor method, for example the method of FIG. 1. The image of FIG. 10 has a less aliased surface. In FIG. 11, there are points 220 at which a segmentation corner cuts into a material due to voxel alignments. The segmentation may overshoot and undershoot. In FIG. 10, taking intensity into account results in a more inclusive outline.

In the embodiment of FIG. 6, the image data values of the volumetric image data set are grayscale values. In other embodiments, different image data values may be used.

In some embodiments, the volumetric image data set comprises a respective color value for each voxel of the volumetric image data set. The volumetric image data set may be described as a color volume. Any suitable method of interpolating color values may be used to obtain a color value at the sample position. A color similarity is used which represents a similarity in color between an interpolated color value at the sample position and a color value at a neighboring voxel. For example the color similarity may be expressed as a color channel L1 norm, L2 norm or max vector norm. The color similarity may be a distance in any appropriate color space, for example a distance in LAB color space.

In other embodiments, a similarity may be a similarity in Brightness (Luma), Lightness, Value only. A similarity in Brightness and/or Lightness and/or Value may be used without considering other information, for example without considering color.

In some rendering methods, a gradient is used to model the appearance of a surface. In some embodiments, the similarity circuitry 46 creates a continuous and smoothly varying field by multiplying the similarity score by the image data value at each point in the volume. The field can be differentiated to create a gradient. The similarity circuitry 46 samples a gradient of the field and calculates a gradient (normal) based on the central difference of the field value. The similarity circuitry 46 determines a direction in which a field is varying, thereby obtaining a surface.

Embodiments described above comprises determining segmentation values for a medical image data set, for example a CT data set. In other embodiments, any suitable medical image data set may be used, which may be of any suitable modality or modalities. The medical image data set may be representative of any human or animal subject.

In further embodiments, segmentation values may be determined for any image data set, which may not be a medical image data set.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. A medical image processing apparatus comprising processing circuitry configured to:
    obtain medical image data comprising or representative of image data values and segmentation values for pixels or voxels of a volume;
    specify a sampling point within the volume;
    select a relevant pixel or voxel for the sampling point from a set of pixels or voxels neighboring the sampling point, wherein the selecting is based on a difference of an interpolated image data value at the sampling point and an image data value for each of the neighboring pixels or voxels and a distance between the sampling point and each of the neighboring pixels or voxels; and
    determine a segmentation value for the sampling point based on a segmentation value at a position of the selected relevant pixel or voxel.

2. An apparatus according to claim 1, wherein the determined segmentation value for the sampling point is the same as the segmentation value at the position of the selected relevant pixel or voxel.

3. An apparatus according to claim 1, wherein each segmentation value comprises a mask value or a label.

4. An apparatus according to claim 1, wherein the segmentation values are representative of one or more anatomical structures.

5. An apparatus according to claim 1, wherein the processing circuitry is further configured to perform an interpolation of image data values for neighboring pixels and voxels to obtain the interpolated image data value at the sampling point.

6. An apparatus according to claim 5, wherein the interpolation comprises trilinear interpolation.

7. An apparatus according to claim 1, wherein the selecting comprises determining a respective score for each of the neighboring pixels or voxels.

8. An apparatus according to claim 7, wherein the relevant pixel or voxel is the neighboring pixel or voxel of the set of neighboring pixels or voxels that has the lowest determined score.

9. An apparatus according to claim 7, wherein, for each neighboring pixel or voxel, the score comprises a sum of a similarity term comprising the difference of the interpolated image data value at the sampling point and the image data value for the neighboring pixel or voxel, and a distance term comprising the distance between the sampling point and the neighboring pixel or voxel.

10. An apparatus according to claim 9, wherein the sum is a weighted sum comprising relative weightings for the similarity term and the distance term.

11. An apparatus according to claim 7, wherein the processing circuitry is further configured to calculate a gradient based on the score for use in rendering at least one image from the medical image data.

12. An apparatus according to claim 11, wherein the processing circuitry is configured to create a continuous field by multiplying values for the score with image data values, and the gradient is a gradient of the continuous field.

13. An apparatus according to claim 1, wherein the processing circuitry is further configured to determine the distance between the sampling point and each of the neighboring pixels or voxels using at least one of:
    interpolation weights, Euclidean distance, vector L1 norm, vector L2 norm, vector max norm.

14. An apparatus according to claim 1, wherein the image data values are grayscale values.

15. An apparatus according to claim 1, wherein the image data values are color values and the difference is a difference between color values.

16. An apparatus according to claim 15, wherein the difference between image data values comprises at least one of a color channel vector L1 norm; a color channel vector L2 norm; a color channel vector max norm; a distance in LAB color space; a measure of at least one of brightness, lightness and value.

17. An apparatus according to claim 1, wherein the processing circuitry is further configured to render at least one image from the medical image data using the determined segmentation value.

18. An apparatus according to claim 17, wherein the rendering of the image comprises at least one of: shaded direct volume rendering; global illuminated direct volume rendering; intensity projection; MPR (multiplanar reformation); MPR slab; full volume maximum intensity projection; full volume minimum intensity projection; full volume average intensity projection.

19. An apparatus according to claim 17, wherein the rendering comprises rendering a segmentation overlay image.

20. A method comprising:
    obtaining medical image data comprising or representative of image data values and segmentation values for pixels or voxels of a volume;
    specifying a sampling point within the volume;
    selecting a relevant pixel or voxel for the sampling point from a set of pixels or voxels neighboring the sampling point, wherein the selecting is based on a difference of an interpolated image data value at the sampling point and an image data value for each of the neighboring pixels or voxels and a distance between the sampling point and each of the neighboring pixels or voxels; and
    determining a segmentation value for the sampling point based on a segmentation value at a position of the selected relevant pixel or voxel.

* * * * *